United States Patent
Yoshitake et al.

(10) Patent No.: US 6,626,062 B1
(45) Date of Patent: Sep. 30, 2003

(54) STEERING WHEEL

(75) Inventors: Kazumiki Yoshitake, Saitama (JP); Hirofumi Otsuka, Saitama (JP); Hiroyuki Kamiya, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/635,773

(22) Filed: Aug. 11, 2000

(30) Foreign Application Priority Data

Aug. 25, 1999 (JP) .......................... P. 11-238920

(51) Int. Cl.$^7$ ................................ G05G 1/10
(52) U.S. Cl. ........................................ 74/552
(58) Field of Search .................. 74/552, 484 R, 74/485; 200/52 R, 61.54, 61.55, 61.56, 61.57, 61.58 R, 61.85

(56) References Cited

U.S. PATENT DOCUMENTS

| | | | |
|---|---|---|---|
| 3,544,743 A | * 12/1970 | Kazuhiro | 200/61.54 |
| 3,567,246 A | * 3/1971 | Wilfert et al. | 280/150 |
| 4,635,029 A | 1/1987 | Yamada | |
| 4,672,214 A | * 6/1987 | Takahashi et al. | 250/551 |
| 5,365,803 A | * 11/1994 | Kelley et al. | 74/484 R |
| 5,520,066 A | * 5/1996 | Tueri | 74/484 R |
| 5,721,541 A | * 2/1998 | Repp et al. | 341/20 |
| 5,949,149 A | * 9/1999 | Shitanaka et al. | 307/10.1 |
| D421,945 S | * 3/2000 | Sacco et al. | D12/176 |
| 6,161,449 A | * 12/2000 | Fujimori | 74/557 |
| 6,225,578 B1 | * 5/2001 | Kobayashi et al. | 200/5 R |
| 2001/0002646 A1 | 6/2001 | Leng | |

FOREIGN PATENT DOCUMENTS

| | | | |
|---|---|---|---|
| DE | 44 36 291 C1 | 10/1994 | |
| DE | 197 18 979 A1 | 5/1997 | |
| EP | 0 706 928 B1 | 10/1995 | |
| JP | 58-30549 | 8/1956 | |
| JP | 57-11133 | 1/1982 | B60R/16/02 |
| JP | 58-224854 | 12/1983 | |
| JP | 61-155038 | 7/1986 | |
| JP | 62-87953 | 6/1987 | B60R/11/02 |
| JP | 64-28364 | 2/1989 | B62D/1/04 |
| JP | 2-102869 | * 4/1990 | 74/552 |
| JP | 3-284470 | * 12/1991 | 74/552 |
| JP | 09-226595 A | 9/1997 | |

* cited by examiner

Primary Examiner—Thomas R. Hannon
Assistant Examiner—Vicky A. Johnson
(74) Attorney, Agent, or Firm—Sughrue Mion, PLLC (57) ABSTRACT

Operation switches 9 are mounted on a steering wheel for operating control apparatuses installed in an automotive vehicle. A supporting body 8 is provided which is disposed inwardly of a wheel rim 2 and substantially concentrically with the wheel rim 2 and having a cross-section partially constituted by an arc 15. The operation switches 9 are disposed on the supporting body 8 and are capable of moving in a circumferential direction of the supporting body 8. By using the operation switches 9 capable of moving in the circumferential direction of the supporting body 8, the direction in which the switches move becomes radial relative to the steering wheel, whereby a number of operation switches can be disposed on the steering wheel in a collective fashion. The direction in which a single switch is operated becomes two ways, and therefore two control functions for a control apparatus can be controlled with a single switch, thus making it possible to make an individual switch multifunctional.

8 Claims, 7 Drawing Sheets

WHEEL RIM

FIG. 10
PRIOR ART

WHEEL RIM

STEERING WHEEL

BACKGROUND OF THE INVENTION

1. Field of the Invention

The present invention relates to a steering wheel, and more particularly to a steering wheel on which various types of switches are arranged.

2. Description of the Related Art

It is demanded that various controlling operations are carried out easily while operating a running vehicle. While operating a running vehicle, the driver performs acceleration and/or deceleration controlling operations (automatic cruise control) directly related to the running of the vehicle, reception and transmission control operations such as answering a telephone call in which the reception and/or transmission of information is carried out relative to the outside, internal apparatuses controlling operations in which internal apparatuses such as an air conditioner and audio equipment are operated, scroll controlling operations for the display of a navigation system and other various controlling operations.

Groups of switches constituted by a plurality of switch elements for the aforesaid controlling operations are arranged on the steering wheel for operation by the driver during driving. Groups of switches arranged in a row in a radial direction on spoke portions of a steering wheel are known in JP-A-58-30549U, groups of switches arranged circumferentially on a wheel rim (grip portions) of a steering wheel are known in JP-A-64-28364U, groups of switches arranged, respectively, on left and right spoke portions disposed at proper angular positions for the fingers of the left and right hands gripping a steering wheel are known in JP-A-57-11133, and groups of switches arranged as an accompaniment to a display panel disposed on a pad portion of a steering wheel are known in JP-62-87953U.

Known as a switch are a push button switch, a slide switch, a seesaw switch, a rotary switch (a volume switch), a composite switch adapted to be rotated and pushed for operation and a touch switch. It is difficult to determine the operating conditions of these switches. The number of switch elements will increase further as communication with the outside becomes multifunctional, the running operating performance becomes sophisticated, and internal apparatuses become diversified.

Figure 9:
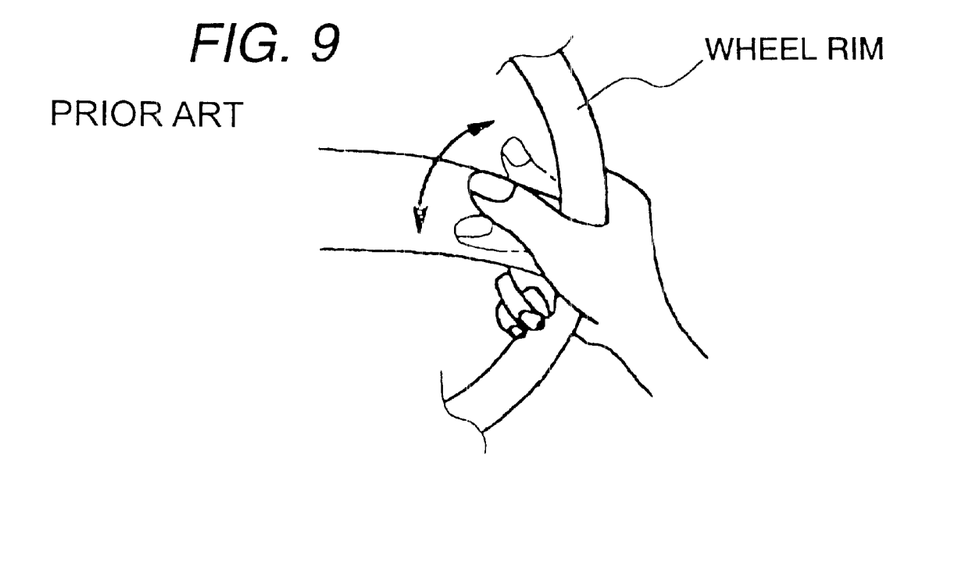
FIG. 9 is a projected view showing a known switch.
Figure 10:
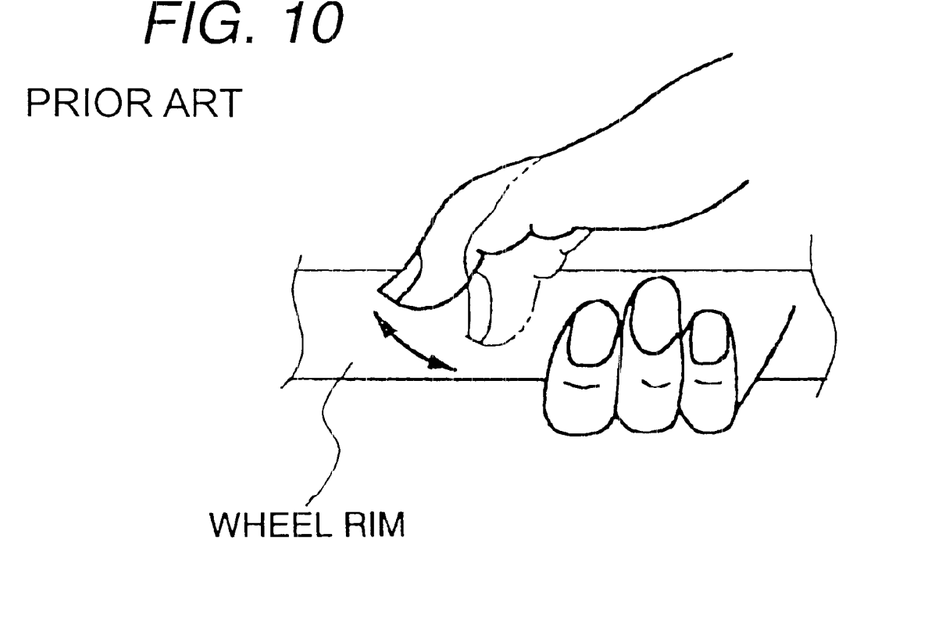
FIG. 10 is a projected view showing another known switch.
Figure 11:
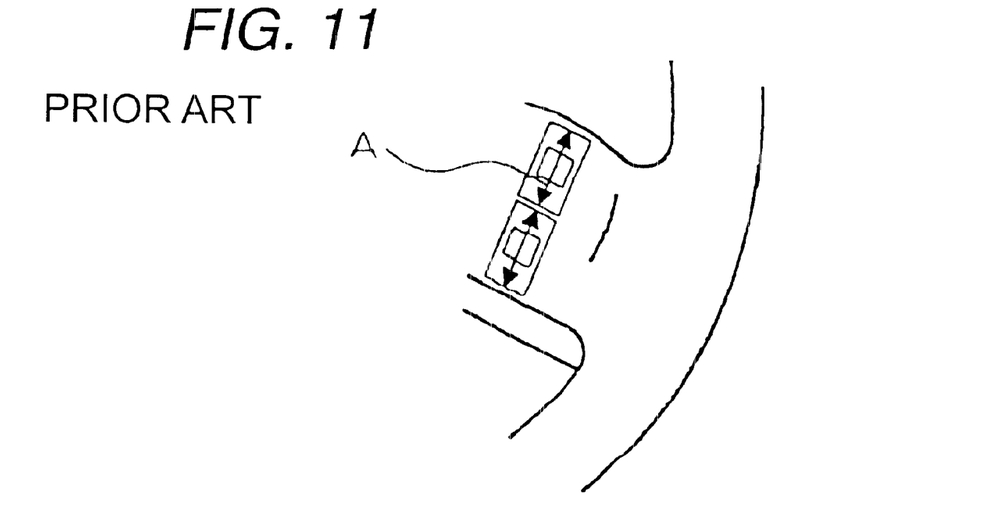
FIG. 11 is a plan view showing further known switches.

FIGS. 9 and 10 show general ergonomic characteristics of the tip of the finger of the hand gripping a steering wheel rim. As shown in FIG. 9, it is illustrated how easily the thumb of the hand gripping the grip which is the steering wheel rim moves on a plane substantially parallel with the plane of the steering wheel rim, and FIG. 10 illustrates how easy it is for the thumb to move in axial directions of the steering wheel rim. It is difficult for thumb to move in directions other than the aforesaid directions. JP-A-57-11133 discloses switches based on movements illustrated in FIG. 11 (a slid switch or a volume switch). In the case of switches like those illustrated switches adapted to move in circumferential directions A of a steering wheel, it is difficult to arrange many of the switches concentrically with a steering wheel within a range which allows operations by the finger of the hand gripping the grip of the steering wheel. As shown in FIG. 11, the difficulty with such a collective arrangement of switches is that since the switches are operated in circumferential directions, a space between the switches together with the operating amount thereof must be made wide.

Figure 12:
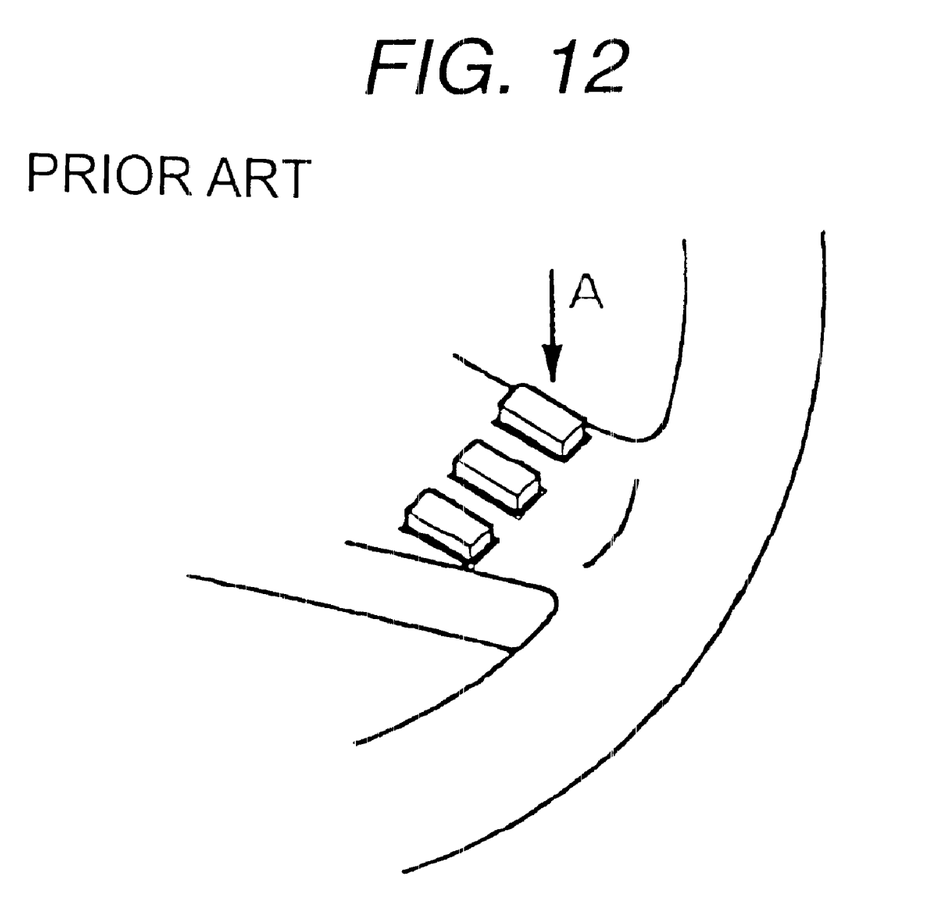
FIG. 12 is a plan view showing further known switches.

The JP-A-58-30549U discloses a switch (a push button switch) based on movements illustrated in FIG. 10. With a switch like that disclosed one, as shown in FIG. 12, since the switch is operated in an axial direction of the steering wheel, the switch space can be reduced, but only a single function can be assigned to a single switch due to its one-way operation. This eventually increases the total number of switches and makes it substantially impossible to collect groups of switches. As the total number of switches increases, it becomes difficult to determine the switches, this deteriorating further the operability of the switches for this reason. With the slide switch, it is possible to provide separate functions in accordance with its operating directions.

It is desired that a number of switch elements can be arranged and that the switching operation is easy. Moreover, it is desired that the discrimination and division of the types of many switch elements can easily be carried out physically and sensuously. Moreover, it is desired that switches can easily be operated by the fingers other than the thumb and that the diversification in switch operation can easily be well accepted. It is hoped that these preferred arrangements of groups of switches provide no feeling of complicatedness while providing a good external appearance.

SUMMARY OF THE INVENTION

An object of the invention is to provide a steering wheel which allows the arrangement of a number of switch elements, facilitates switching operations and avoids the deterioration in operability due to the increase in number of switch elements.

A further object of the invention is to provide a steering wheel which facilitates the discrimination and division of types of a number of switches physically and sensuously.

A further object of the invention is to provide a steering wheel which facilitates the switching operations by the fingers other than the thumb and allows the diversification in switching operations to be well accepted.

A further object of the invention is to provide a steering wheel which allows the arrangement of a number of switch elements, facilitates switching operations, and provides no complicatedness in arrangement of groups of switches while providing a good external appearance.

According to the invention, there is provided a steering wheel on which operation switches for operating control apparatuses installed in an automotive vehicle are mounted, comprising a supporting body disposed inwardly of and substantially concentrically with a wheel rim and having a cross-section partially formed by an arc, the control switches being disposed on the supporting body and capable of moving in a circumferential direction of the supporting body.

Thus, by using the operation switches disposed on the supporting body disposed substantially concentrically with the wheel rim and having a cross-section partially formed by an arc and capable of moving in circumferential directions of the supporting body along the arc thereof the travelling direction of the operation switches becomes radial directions relative to the steering wheel, and the disposing space of the switches can be reduced, thereby making it possible to collectively arrange a number of switches on the steering wheel. In addition, the detecting direction of the single switch becomes at least two directions, and two controlling functions for the controlling apparatus can be controlled with the single switch and therefore multiple functions can be provided on individual switches. Moreover, since many of the operation switches mounted on the steering vehicle can be arranged concentrically with the steering wheel, the quality of the product can be improved by the superior external appearance thereof.

It is preferred that the supporting body is disposed in front of the steering wheel toward the front of the vehicle. This enables the operation of the switches with the other fingers other than the thumb (for example, the index finger), whereby the operability of the switches can be improved.

A space between the operation switches for use for controlling different apparatuses is wider than a space between the operation switches for use for controlling the same apparatus. Since grouping of the operation switches for every apparatus can be visualized, the discrimination of the operating switches becomes simple, whereby the operability thereof can be improved.

It is preferred that the operation switch is capable of moving even in a radial direction of the supporting body. The operating direction can be made two-dimensional, whereby the collected switches can be made multifunctional further.

DETAILED DESCRIPTION OF THE PREFERRED EMBODIMENTS

Figure 1:
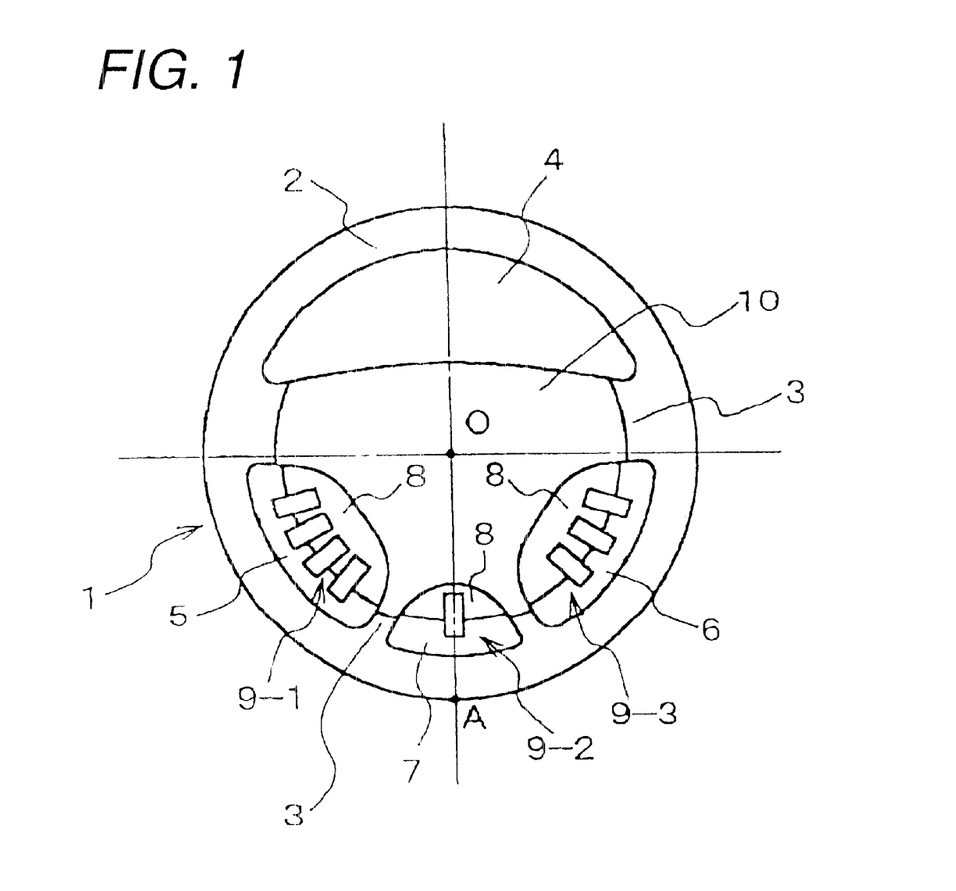
FIG. 1 is a plan view showing an embodiment of an arrangement of groups of switches on a steering wheel according to the invention.

In correspondence with the accompanying drawings, a steering wheel according to the invention is provided with groups of switches including various types of switch elements. As shown in the drawings, a steering wheel 1 of an automotive vehicle has a substantially annular contour as shown in FIG. 1 and is disposed on a plane having a certain proper angle relative to a horizontal plane.

The steering wheel 1 comprises a wheel rim 2, a pad 10 and spokes 3. The steering wheel 1 is rotatably supported on a rotating shaft having a rotational center axis passing through a generally central point of the steering wheel or a general center O.

Four windows are provided in the steering wheel 1 due to positions where the spokes are laid out. The four windows are a front window 4, a rear left-hand side window 5, rear right-hand side window 6 and a rear window 7. When used in here, the front and rear are defined based on a direction in which the driver looks at the steering wheel 1 when running the vehicle straight. The front window 4, rear left-hand side window 5, rear right-hand side window 6 and rear window 7 are disposed symmetrically with each other relative to a vertical plane (hereinafter, referred to as a reference plane) passing through the general center O and a lowest end point A (corresponding to a rearmost end point). Meters (not shown) are seen through the front window 4 as existing forward of the front window 4.

Figure 2:
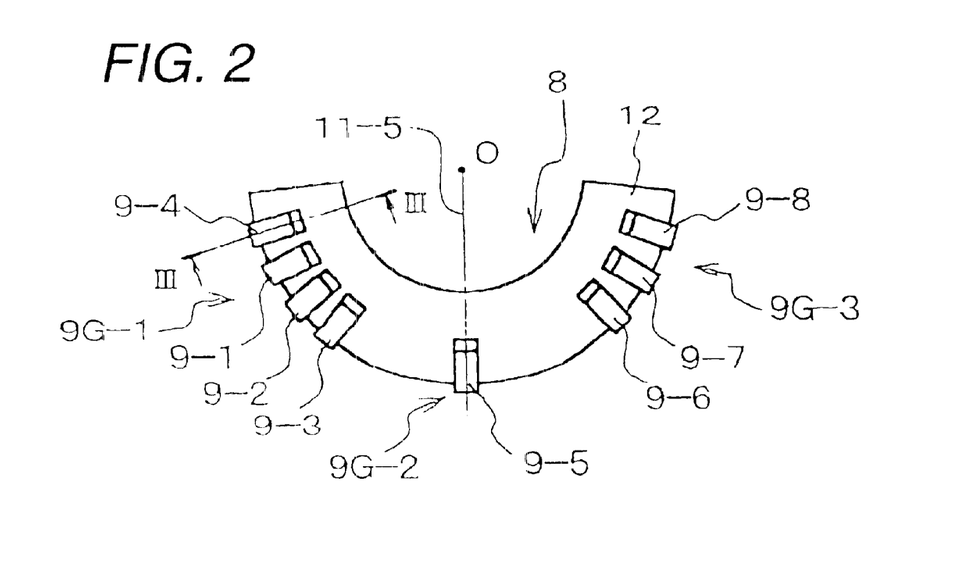
FIG. 2 is a plan view showing a part shown in FIG. 1.
Figure 3:
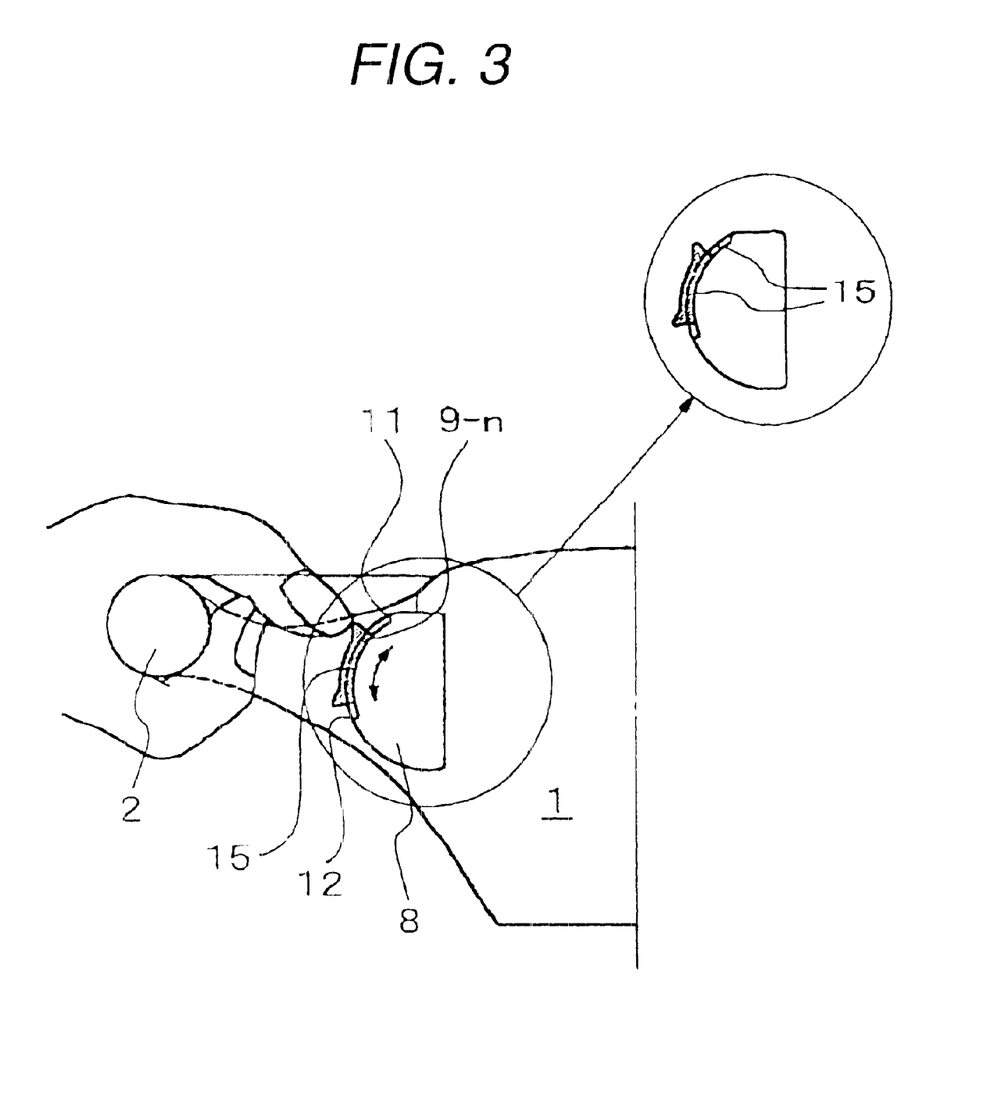
FIG. 3 is a cross-sectional view taken along the line III—III of FIG. 2.

FIG. 2 shows groups of switches which will be described later. FIG. 3 shows a cross-section taken along a plane passing through the general center O and vertical to the plane in which the steering wheel is disposed and it is a cross-section taken along the line III—III of FIG. 2. A supporting body 8 is disposed between the wheel rim 2 and the pad 10. The supporting body 8 extends, as shown in FIG. 1, from an angular position at the left end of the rear left-hand side window 5 via an angular position in the rear window 7 to an angular position at the right end of the rear right-hand side window 6. The supporting body 8 is disposed concentrically relative to the wheel rim 2. An arc or an arc-like curve (hereinafter, referred to as a general arc 15) is formed in the cross-section of the supporting body 8. The general arc 15 is a curve extending while having a component in radial directions of the steering wheel (hereinafter, referred to as circumferential directions).

As shown in FIG. 2, provided on the supporting body 8 are groups of switches 9 comprising eight switch elements 9-1 to 9-8. The respective switch elements 9-n (n=1 to 8) move along the circumferential directions of the general arc of the supporting body 8. These circumferential movements are reciprocating movements possible to take place between both stopping ends 11, 12 formed on the supporting body 8, and the switch elements 9-n can be stopped stably at neutral positions. When located at the neutral positions, the switch elements 9-n are separated away from the respective stopping ends 11, 12 and can move in either direction along the general arcs from the neutral positions. These two directions correspond to two switching functions.

Figure 4:
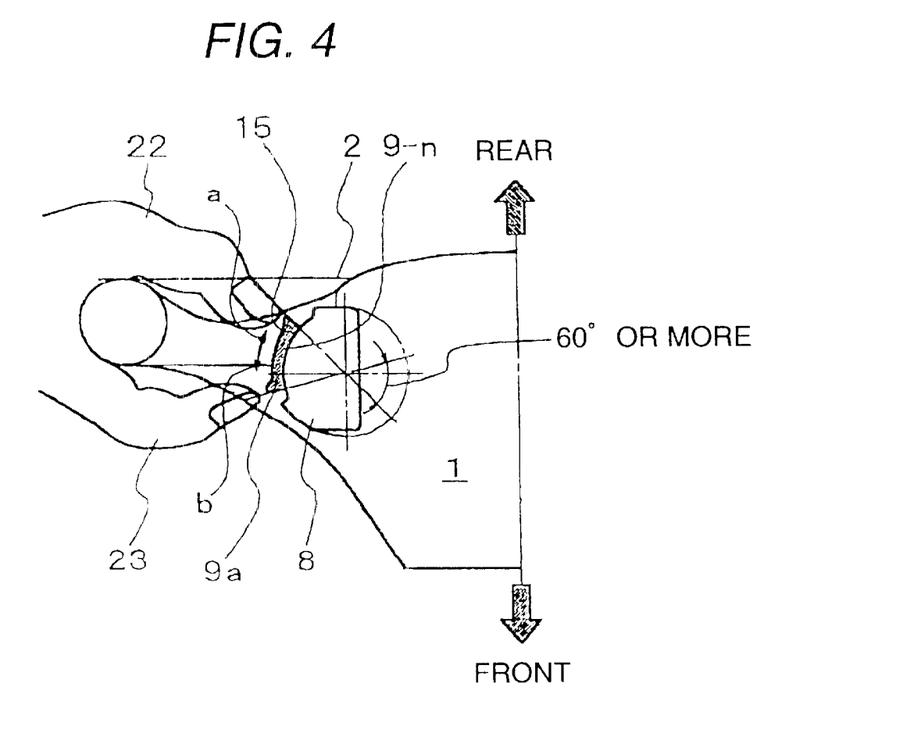
FIG. 4 is a plan view showing another embodiment of an arrangement of groups of switches on the steering wheel according to the invention.

FIG. 4 shows a positional relationship between the wheel rim 2 and the supporting body 8. FIG. 4 defines and shows a front (forward) side and a rear (a driver's side or rearward) side. The supporting body 8 is positioned forward of the wheel rim 2. The thumb 22 and index finger 23 of the left hand of the driver straddle the wheel rim 2 so as to surround it, and the thumb and the index finger 23 catch, respectively, front and rear ends of one of the switch elements 9-n. In general, as to the fingers of the hands grasping the grips, a force applied in a grasping direction by the finger is strong, whereas a force applied in an opening direction by the finger is weak. In a state as shown in FIG. 4, with the thumb 22 it is easy to apply a force in a direction b along the general arc 15 and therefore it is easy to perform operations in that direction, while with the same thumb 22 it is difficult to apply a force in a direction along he general arc 15 and therefore it is difficult to perform operations in that direction. The reverse is true with the index finger. The movements of the switch elements in the two directions along the general arc 15 are made easy by either of the thumb and the index finger, whereby the operability of the operation switches is improved. In addition, it is preferred that a switch knob 9a occupies an angular range of the circumference of the arc of the supporting body 8 over 60 degrees.

Figure 5:
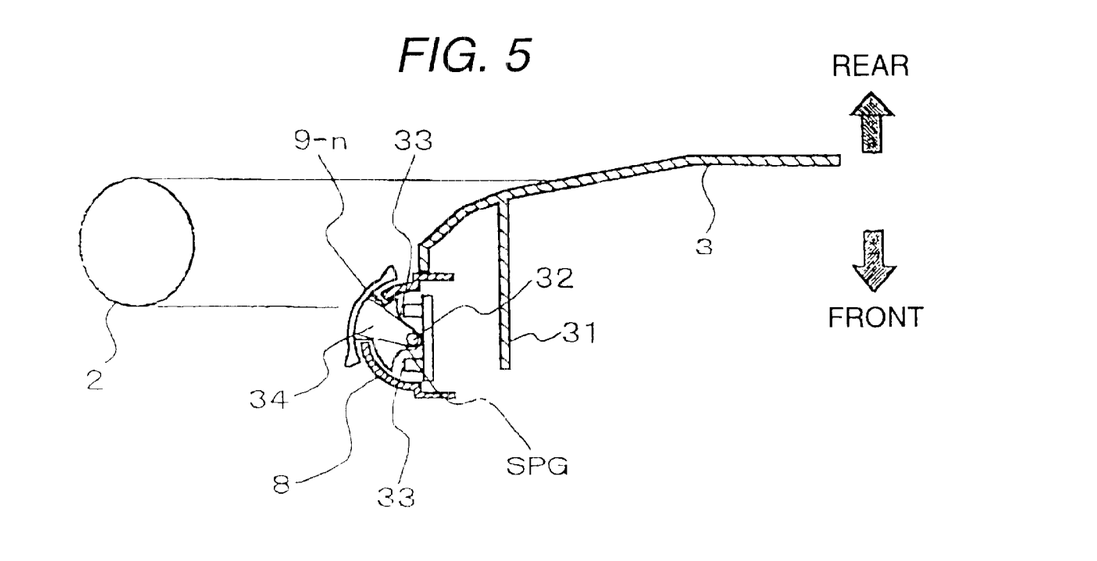
FIG. 5 is a plan view showing a further embodiment of an arrangement of groups of switches on the steering wheel according to the invention.

FIG. 5 shows a concrete construction of the described two-way operation switches 9-n. A supporting shaft 32 and two switching devices 33 are provided at a proximal portion 31 contained in the supporting body 8. Pendulums 34 are supported on the supporting shaft 32 in such a manner as to oscillate. The switch elements 9-n are mounted on the pendulums 34. The switch elements 9-n oscillate along the arc around the axial center of the supporting shaft 32 as its center. The switch elements 9-n are stopped at neutral positions by spring elements (SPG). When the switch elements 9-n displace along 10 the arc from the neutral positions, the pendulums 34 integral with the switch elements 9-n act on one of the two switching devices 33, and the one performs a switching operation corresponding to the selected switching device 33.

Figure 6:
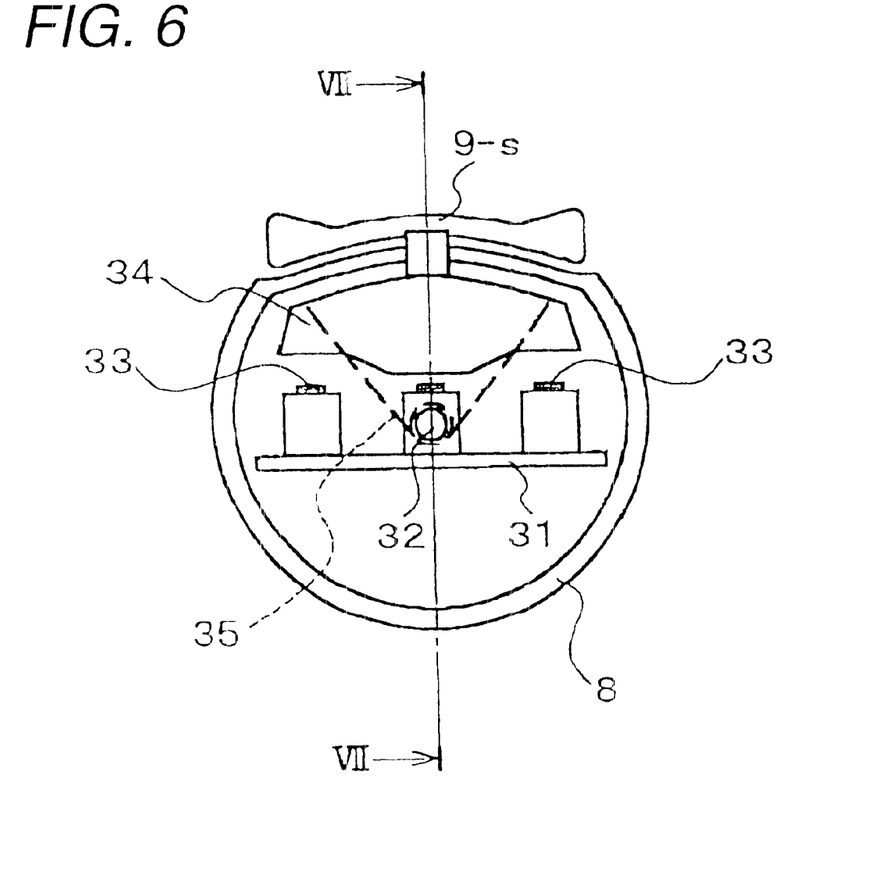
FIG. 6 is a plan view showing a further embodiment of an arrangement of groups of switches on the steering wheel according to the invention.
Figure 7:
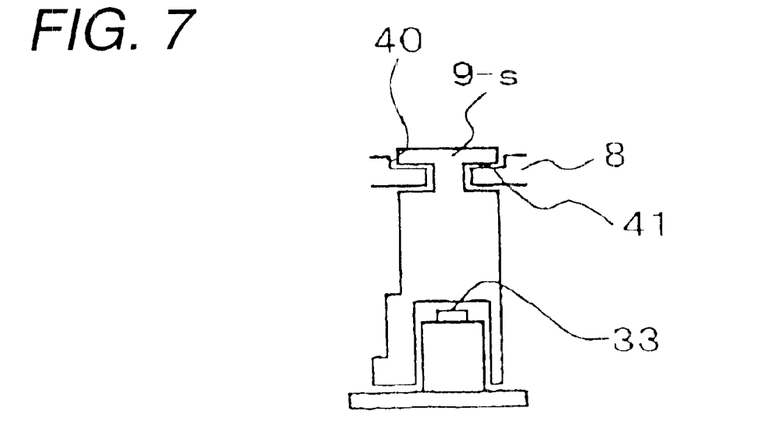
FIG. 7 is a cross-sectional view taken along the line VII—VII of FIG. 6.

FIG. 6 shows a three-way switch element 9-s in which a movement in a further direction is added to the aforesaid two-way switch element 9-n. This three-way switch element 9-s is identical with the two-way switch element 9-n in that a supporting shaft 32 and two switching devices 33 are provided in a proximal portion 31 contained in the supporting body 8, and that pendulums 34 are supported on the supporting shaft 32 in such a manner as to oscillate. The pendulums 34 are supported on the supporting shaft 32 via spring elements 35 wound around the supporting shaft 32. The three-way switch element 9-s is identical with the two-way switch element 9-n in that the former displaces in two directions on the arc but is different from the two-way switch element 9-n in that the three-way switch element 9-s performs a fluctuating movement in a third direction on a radial line having a direction toward the supporting shaft 32. The three-way switch element 9-s can be restored to its neutral position by virtue of a restoring force of the spring element 35 both on the arc and the radial line. In other words, the three-way switch element 9-s can displace both in the circumferential and radial directions of the supporting body 8. Note that a knob portion of the switch element moving on the general arc is guided, as shown in FIG. 7, in a groove 40 formed in the supporting body 8, and an extra space is provided in the groove 40 such that the knob portion can move in the radial direction, as well, in the groove 40.

The switch groups 9 of switch elements are provided as divided into a first group of switch elements which move only in one direction on the general arc, a second group of switch elements which move in two directions on the general arc and a third group of switch elements which additionally move in the radial direction.

As shown in FIG. 2, the switch groups 9 are illustrated as comprising three partial groups 9G-1 to 9G-3. To illustrate the respective partial groups, a first partial group 9G-1 is a switch group for controlling visual- and audio-related equipment and comprises four switch elements 9-1 to 9-4. A second partial group 9G-2 is a switch group for controlling in-compartment environmental equipment and comprises a single switch element 9-5, and a third partial group 9G-3 is a switch group for controlling acceleration- and/or deceleration—related equipment and comprises three switch elements 9-6 to 9-8. The respective partial groups comprise a single switch element or a combination of a plurality of switch elements selected from the first group of switch elements, the second group of switch elements and the third group of switch elements. The movements of the respective switch elements correspond to one of the functions of each apparatus. For illustration, a single movement of the switch element in one direction on the arc corresponds to an increase in volume by a single step, while a single movement of the switch element in the other direction on the arc corresponds to a decrease in volume by a single step. A corresponding relationship like this is established only when a plurality of functions of a control apparatus are combined with a plurality of operation detecting directions (moving directions) in various ways.

Figure 8:
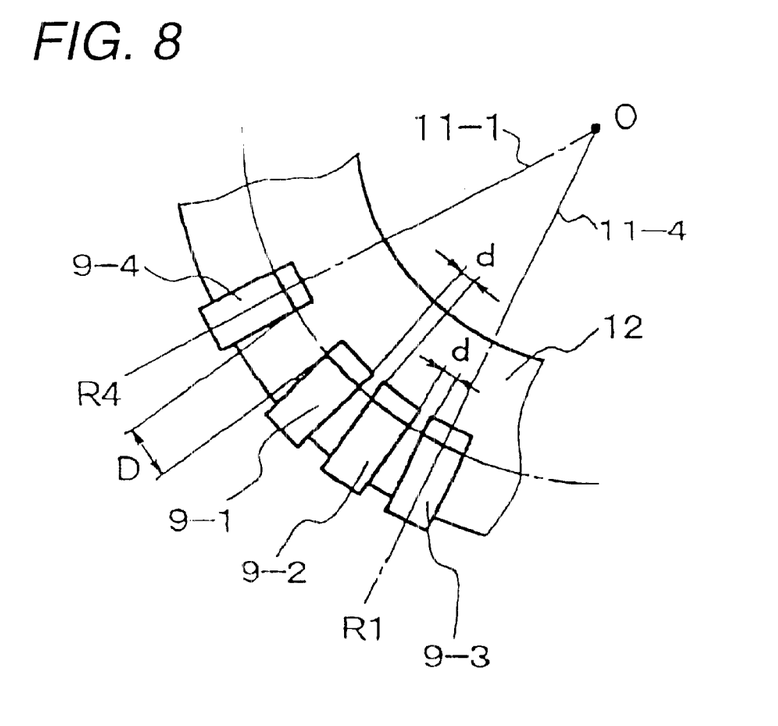
FIG. 8 is a plan view showing a layout of a plurality of switches.

FIG. 8 shows a positional relationship of the four switch elements 9-1 to 9-4 of the partial group 9G-1. The switch elements 9-1 to 9-3 correspond to the control of the audio equipment and the switch element 9-4 corresponds to communication equipment (a telephone). Two spaces d between the switch elements 9-1 to 9-3 are identical but a space D between the switch element 9-1 and the switch element 9-4 is designed such that it becomes wider than the space d. Therefore, since the grouping of the switch elements can be visualized for each control apparatus (here, the built-in audio equipment and the external communication equipment), the discrimination of the switch elements to be operated can be made simple, whereby the operability can be improved.

With the switch groups on the steering wheel according to the present invention, a number of arrangements of switch elements can be effected on the steering wheel, and the switching operations can be made simple. In addition, the discrimination and division of the groups of a number of switch elements can easily be effected physically and sensuously. The switching operation can easily be effected not only by the thumb but also by the other fingers. In addition, other various accompanying effectiveness can be provided.

By adopting the operation switches disposed on the supporting body disposed substantially concentrically with the steering wheel and having the cross-section partially constituted by the arc in such a manner as to move along the arc or in the circumferential direction of the supporting body, the operation switches are allowed to move in radial directions (directions A as seen in FIG. 1) relative to the steering wheel, whereby the switches can be disposed on the steering wheel in a collective fashion (thereby making it possible to dispose a number of switches thereon). In addition, since the detection of directions in which the single switch is operated can be carried out in two ways, two control functions for a single control apparatus can be controlled with the single switch (making the switch multifunctional). Moreover, since the arrangements of many of the operation switches mounted on the steering wheel become concentric with the steering wheel, a good external appearance can be provided, thereby making it possible to improve the quality of the product.

The operation switches can be operated by the fingers other than the thumbs while gripping the steering wheel by disposing the supporting guide forwarder than the steering wheel toward the front of the vehicle, whereby the operability of the operation switches can be improved.

The space between the switches for use for controlling difference equipment is made wider than the space between the switches for use for controlling the same equipment, whereby the grouping of the operation switches for respective equipment can be visualized, facilitating the discrimination of the operation switches, thereby making it possible to improve the operability thereof.

The operation switch is capable of moving in the radial direction of the supporting body, and therefore three control functions for the single control apparatus can be controlled with the single switch. Thus, the operation switch can be made multifunctional further, and the number of control apparatuses that are controlled with the steering wheel can be increased further, this improving the controllability of the apparatuses.

While only certain embodiments of the invention have been specifically described herein, it will apparent that numerous modifications may be made thereto without departing from the spirit and scope of the invention.

The present disclosure relates to the subject matter contained in Japanese patent application No. Hei. 11-238920 filed on Aug. 25, 1999, which is expressly incorporated herein by reference in its entirety.

What is claimed is:

1. A steering wheel, comprising:

a wheel rim;

a pad and spokes;

a window portion defined by said pad, wheel rim and spokes;

a supporting body disposed projectedly within said window portion and substantially concentrically with said wheel rim, said supporting body being at least partially formed in an arc shape in cross-section, said supporting body being arranged in a front side of a vehicle with respect to said wheel rim; and at least one operation switch operating a control apparatus installed in an automotive vehicle, said operation switch being disposed on said supporting body and being movable in a circumferential direction of said arc shape of said supporting body, wherein said circumferential direction of said arc shape is a curve having a component in a radial direction of said wheel rim with respect to a center axis of said wheel rim, wherein said at least one operation switch includes a front end and a rear end separated from each other by a predetermined distance, said front and rear ends serving as operation segments capable of engaging, respectively, with a thumb and index finger of an operator.

2. The steering wheel according to claim 1, wherein a space between said adjacent operation switches controlling different apparatuses is wider than a space between said adjacent operation switches controlling the same apparatus.

3. The steering wheel according to claim 1, wherein said at least one of operation switches is movable in a radial direction of said arc shape of said supporting body.

4. The steering wheel according to claim 1, wherein said supporting body is disposed forward of said wheel rim so as to project from a side of said wheel rim that faces the front of said vehicle.

5. The steering wheel according to claim 1, wherein the predetermined distance between the front end and the rear end is approximately 60°, as measured along the arc-shaped cross section of the supporting body.

6. A steering wheel, comprising:

a wheel rim;

a pad and spokes;

a window portion defined by said pad, said wheel rim and said spokes;

a supporting body disposed projectedly within said window portion and substantially concentrically with said wheel rim, said supporting body being at least partially formed in an arc shape in cross-section, said supporting body being arranged in a front side of a vehicle with respect to said wheel rim; and at least one operation switch operating a control apparatus installed in an automotive vehicle, said operation switch being disposed on said supporting body and being movable in a circumferential direction of said arc shape of said supporting body, wherein said circumferential direction of said arc shape is a curve having a component in a radial direction of said wheel rim with respect to a center axis of said wheel rim, wherein said at least one operation switch is disposed between adjacent spokes of the steering wheel, wherein said at least one operation switch includes a front end and a rear end separated from each other by a predetermined distance, said front end and said rear end serving as operation segments capable of engaging, respectively, with a thumb and an index finger of an operator.

7. A steering wheel, comprising:

a wheel rim;

a pad and spokes;

a window portion defined by said pad, said wheel rim and said spokes;

a supporting body disposed projectedly within said window portion and substantially concentrically with said wheel rim, said supporting body being at least partially formed in an arc shape in cross-section, said cross-section being taken along a plane on which a rotational center axis of said wheel rim lies, said supporting body being arranged in a front side of a vehicle with respect to said wheel rim; and at least one operation switch operating a control apparatus installed in an automotive vehicle, said operation switch being disposed on said supporting body, wherein the arc shape of said supporting body in cross-section is a curve having a component in a radial direction of said wheel rim, and said at least one operation switch moves along the curve, wherein said at least one operation switch includes a front end and a rear end separated from each other by a predetermined distance, said front end and said rear end serving as operation segments capable of engaging, respectively, with a thumb and an index finger of an operator.

8. A steering wheel, comprising:

a wheel rim;

a pad and spokes;

a window portion defined by said pad, said wheel rim and said spokes;

a supporting body disposed within said window portion and substantially concentrically with said wheel rim, said supporting body being at least partially formed in an arc shape in cross-section, said supporting body being arranged in a front side of a vehicle with respect to said wheel rim; and at least one operation switch operating a control apparatus installed in an automotive vehicle, said operation switch being disposed on said supporting body and being movable in a circumferential direction of said arc shape of said supporting body, wherein an operation direction of said operation switch substantially coincides with a radial direction of said wheel rim, wherein said at least one operation switch includes a front end and a rear end separated from each other by a predetermined distance, said front end and said rear end serving as operation segments capable of engaging with a thumb and an index finger, respectively, of an operator.

* * * * *